United States Patent
Smith et al.

(10) Patent No.: US 11,985,066 B2
(45) Date of Patent: May 14, 2024

(54) RETRIEVING CONGESTION CONFIGURATION INFORMATION AUTOMATICALLY FROM A CENTRALIZED REPOSITORY

(71) Applicant: DELL PRODUCTS L.P., Round Rock, TX (US)

(72) Inventors: Erik Smith, Douglas, MA (US); Vinay Sawal, Fremont, CA (US); Joseph LaSalle White, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 382 days.

(21) Appl. No.: 17/239,294

(22) Filed: Apr. 23, 2021

(65) Prior Publication Data

US 2022/0345406 A1    Oct. 27, 2022

(51) Int. Cl.
*H04L 47/12* (2022.01)
*G06F 16/22* (2019.01)

(52) U.S. Cl.
CPC ............ *H04L 47/12* (2013.01); *G06F 16/221* (2019.01); *G06F 16/2282* (2019.01)

(58) Field of Classification Search
CPC .............................. H04L 47/12; G06F 16/221
See application file for complete search history.

(56) References Cited

U.S. PATENT DOCUMENTS

| | | | |
|---|---|---|---|
| 8,441,922 B1* | 5/2013 | McGlaughlin | H04L 49/357 710/32 |
| 2005/0111378 A1* | 5/2005 | Chen | H04L 43/00 370/252 |
| 2013/0151646 A1* | 6/2013 | Chidambaram | H04L 49/9094 709/213 |
| 2022/0174021 A1* | 6/2022 | Catalano | H04L 47/33 |

* cited by examiner

*Primary Examiner* — Donald L Mills
(74) *Attorney, Agent, or Firm* — NORTH WEBER & BAUGH LLP (57) ABSTRACT

Solutions to configure congestion reaction behavior of end devices of a Fibre Channel (FC) fabric, to the extent that any such solutions exist, are inefficient, cumbersome, and unscalable. The present document discloses embodiments of a distributed Congestion Control Service that may use FC services and communication paths to distribute congestion control actions (e.g., during login or at other times such as configuration parameters change). Embodiments also allow for congestion configuration parameters to be provided to end devices in a transport-agnostic way. Furthermore, congestion control actions may be delivered on-demand or at other times, such as after a change.

20 Claims, 8 Drawing Sheets

RETRIEVING CONGESTION CONFIGURATION INFORMATION AUTOMATICALLY FROM A CENTRALIZED REPOSITORY

BACKGROUND

The present disclosure relates generally to information handling system. More particularly, the present disclosure relates to retrieving congestion configuration information.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Congestion spreading is a very common problem in lossless (e.g., Fibre Channel (FC)) networks. Congestion spreading typically happens when a host attempts to read data from storage at a rate that is greater than the host can consume. This may occur when a host bus adapter (HBA) port is attached to a Storage Area Network (SAN) at a slower speed than the array is connected. For example, a host HBA speed may be at 8 GB/s and a target array speed may be at 16 GB/s. While in this configuration, if the host transmits READ IOs (Input/Output) at a rate that results in more than 8 GB/s being returned to the host, the result would be frames being queued in the fabric. These queued frames may congest the switch port and would also start to buildup on any inter switch links (ISLs) in a data path. When this happens, the fabric starts getting congested and other hosts connected to the same fabric also experience IO delays. This would eventually affect the IO performance of other hosts, and the entire fabric may become congested. Hosts running IOs do not know the reason of congestion in the fabric. All hosts may start to have IO performance drop. This problem is generally referred to as congestion spreading due to over-subscription.

Accordingly, it is highly desirable to find efficient ways to retrieve congestion configuration information automatically from a centralized repository for problem solving.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of retrieving congestion configuration information in SANs, aspects of the present disclosure are not so limited. Accordingly, the aspects of the present disclosure may be applied or adapted for use in other contexts.

A. Congestion Spreading Problem

Congestion spreading is a very common problem in lossless, e.g., FC, networks. Congestion spreading typically happens when a host attempts to read data from storage at a rate that is greater than it can consume. This can occur when a HBA port is attached to a SAN at a slower speed than the array is connected. For example, a host HBA speed may be at 8 GB/s and a target array speed may be at 16 GB/s. While in this configuration, if the host transmits READ IOs at a rate that would result in more than 8 GB/s being returned to the host, the result would be frames being queued in the fabric. These queued frames may congest the switch port and would also start buildup on any ISLs in a data path. When this happens, the fabric starts getting congested and other hosts connected to the same fabric starts getting IO delay. This would eventually affect the IO performance of other hosts and the entire fabric may become congested. Hosts running IOs do not know the reason of congestion in the fabric. All hosts may start to have IO performance drop. This problem is generally referred to as congestion spreading due to over-subscription.

One mechanism that may be used to address this type of issue in an FC network is for the fabric to notify an end device that is causing congestion spreading via either a Fabric Performance Impact Notification-Congestion Notification (FPIN-CN) or a congestion signal. The FPIN-CN is a standards-based Extended Link Service (ELS) request sent from a switch to an end device that is causing congestion. The congestion signal is a primitive sequence that is also sent from the fabric to the end device. It shall be noted that the reason for two defined mechanisms is related to the fact that ELS requests cannot be transmitted from the fabric to the end device when congestion is present, but a primitive sequence can.

Congestion notifications and signals are intended to be consumed by end devices and impact how much of a load they are putting onto the fabric. The problem associated with using this approach to remediate congestion spreading is two-fold as described below.

First, this approach does not clearly define how the end devices should react to the reception of congestion notification. Should the end devices do nothing? Cut the number of READ requests by 10%, 50%?, Failover? Such a lack of clarity may be an issue because currently all end devices will react to congestion notification events in independent ways. The reaction may be not only a function of implementation but also how the end devices have been configured by default.

Second, this approach brings an issue of how the above configuration decision is communicated to the end devices without requiring each fabric switch to communicate directly to each end device. This is especially a problem because currently the only configuration mechanisms available are either: 1) a user would need to configure each end device manually, or 2) making use of a vendor specific tunneling mechanism that is not interoperable across HBAs of different types nor across end device types (e.g., Hosts and Storages).

Currently, to the extent that such information is distributed, it would be distributed to end devices via HBA vendor-specific interfaces. This drastically reduces the usefulness of the fabric notification concept by requiring users to individually configure each HBA type, if it were even supported or supportable.

In addition to congestion notification events, there may be other types of fabric performance impact notifications, e.g., Link Integrity events (FPIN-LI). These FPIN-LI events are generated by the fabric when an unreliable (e.g., high bit error rate (BER)) link is detected. High BER links may be very disruptive and require immediate remediation.

B. Embodiments of Fibre Channel Fabric Based Congestion Control

To the extent any solutions to configure congestion reaction behavior of end devices of a FC fabric exist, they are inefficient, cumbersome, and unscalable. One might be able to go to every host and configure the hosts manually (if it could support such as feature), which requires a lot of coordination and time, or one might be able to set up a Management Orchestration Framework (MOF). However, for the MOF approach, a plug-in or adaptor may be needed for every device type to be communicated with, which may not exist or be supported or supportable by the device. Consequently, the fabric network needs to deal with a cross of multiple adaptors as well as devices that the adaptors can possibly support, which creates at least an n×m scale problem.

The present patent document discloses embodiments of a distributed Congestion Control Service that uses existing Fibre Channel services and existing communication paths to distribute congestion control actions at various times, such as login and any time configuration parameters change as indicated via the reception of a registered state change notification (RSCN). Congestion configuration parameters may be provided to end devices in a transport agnostic way. Embodiments of the present disclosure may be applied to Remote Direct Memory Access (RDMA) over Converged Ethernet (RoCE) or Transmission Control Protocol (TCP), for example. Furthermore, congestion control actions may be delivered on-demand and after a change, and specific triggers for sending a congestion control action or message may be set by a user.

In one or more embodiments, the fabric resident service may provide congestion configuration parameters for end devices upon request, and may drive consistency across all devices that are attached to the fabric. A centralized fabric service, whether instantiated as a well-known address in FC or as a part of Centralized Discovery Controller (CDC) implementation (e.g., NVMe-oF/TCP, where NVMe-oF means Nonvolatile Memory Express over Fabrics), congestion configuration parameters may be provided to end devices and therefore, the end devices may operate in the same way or a coordinated way when a congestion event happens. Furthermore, embodiments of the present disclosure eliminate the need to setup a MOF, therefore simplify the structure of the FC fabric.

Figure 1:
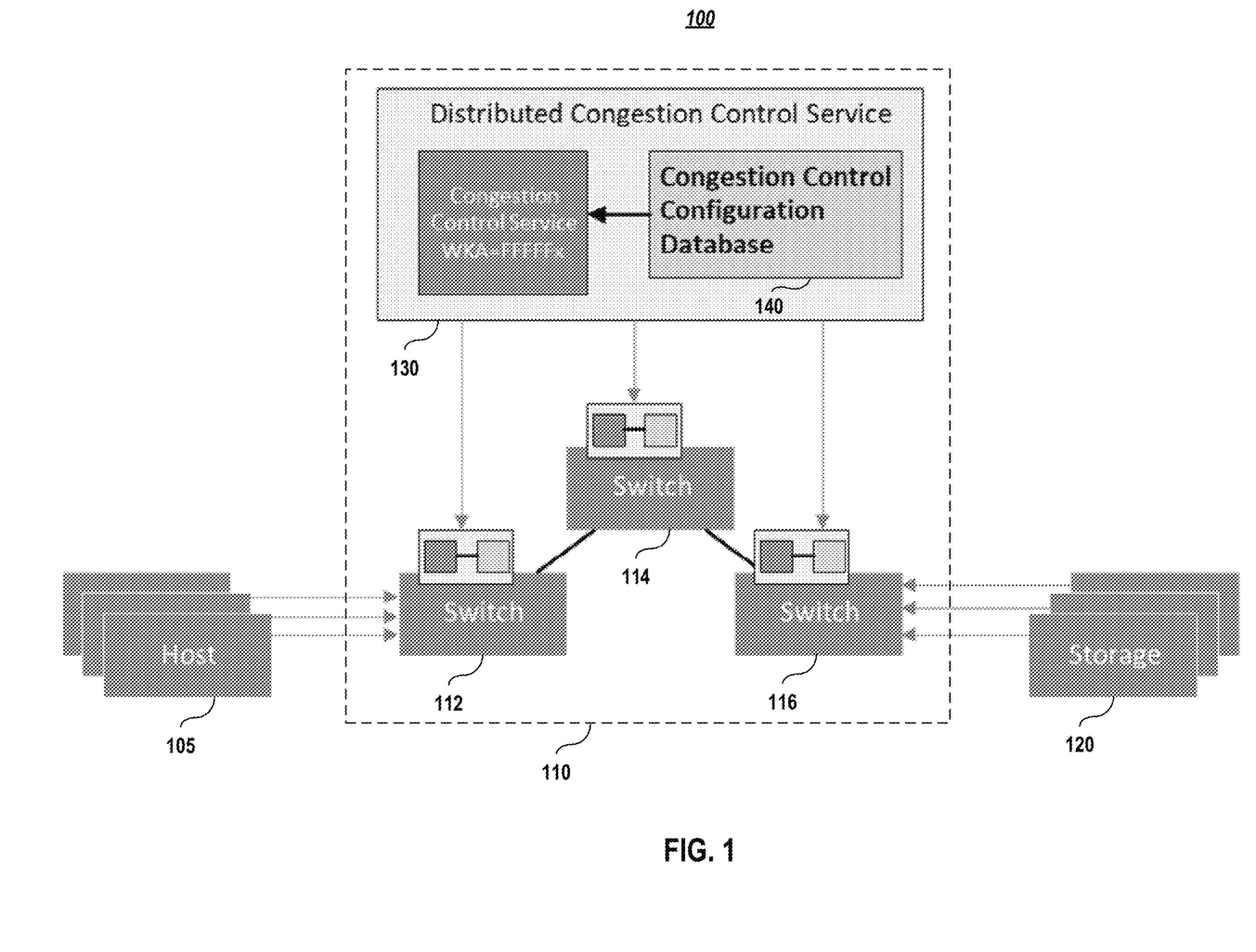
FIG. 1 depicts architecture for a Fibre Channel Fabric based congestion control service, according to embodiments of the present disclosure.

FIG. 1 depicts architecture for a FC fabric-based congestion control service, according to embodiments of the present disclosure. As shown in FIG. 1, the architecture 100 for congestion control service comprises one or more hosts 105 coupled to one or more storages 120 via a FC fabric 110, which comprises a plurality of switches, e.g., switches 112, 114, and 116. In one or more embodiments, the one or more storages 120 have interfaces that are participating in a Storage Area Network (SAN) within the FC fabric 110. A congestion control service 130 is provided to the FC fabric 110. The congestion control service may be implemented in software, hardware, or a combination thereof. In one or more embodiments, the congestion control service may be associated with a well-known address on the switch to distribute congestion control information. In one or more embodiments, the congestion control service may be provided by a congestion control server which may reside under a management server.

In one or more embodiments, the congestion control service 130 may contain a congestion control configuration database 140 for storing congestion control information that may be distributed among the plurality of switches within the FC fabric 110. In one or more embodiment, the congestion control configuration database 140 is a table that comprises a plurality of rows of data entries in columns (e.g., three columns).

Table 1 lists some exemplary entries in a congestion control configuration database. The first column is a type column defining an event type that an end device may receive. Exemplary entries in the type column may be FPIN-CN (indicating an event for congestion notification) or FPIN-LI (indicating an event for link integrity). The second column, also referred as a "RX by" column shown in FIG. 3, defines one or more end devices associated to the event in the first column that could receive the event. Exemplary entries under the second column may be a wildcard, a class of end devices, or a specific device identifier (e.g., a worldwide port name (WWPN) but other or additional identifiers may be used). The third column is an action column defining an action for the one or more end devices to implement. A wildcard entry, e.g., '*', in the second column implies that all end devices should perform an action defined in the row. An entry of end device class in the second column implies that all end devices belong to the end device class should perform the action. In one or more embodiments, an end device class may be initiator, target or a combination of initiator and target. In one or more embodiments, an end device class may be further defined within a group or a zone associated with the Fibre Channel Fabric. For example, the entry of end device class may be limited to a specific initiator or initiators (or specific targets) coupled to the Fibre Channel Fabric via a specific zone (e.g., a specific switch or switches). In one or more embodiments, an end device class may be further defined within a session associated with the Fibre Channel Fabric 110. The session may be specifically limited to a designated combination of one or more initiators and one or more targets.

TABLE 1

Exemplary congestion configuration table

| Notification Type | End device | Action |
| --- | --- | --- |
| FPIN-CN | Initiator | Reduce READ Request by 50% |
| FPIN-CN | Target | Drop Bandwidth to Host by 50% |
| FPIN-LI | Initiator | Failover to port x |
| FPIN-LI | Target | N/A |
| . . . | . . . | . . . |

Figure 2:
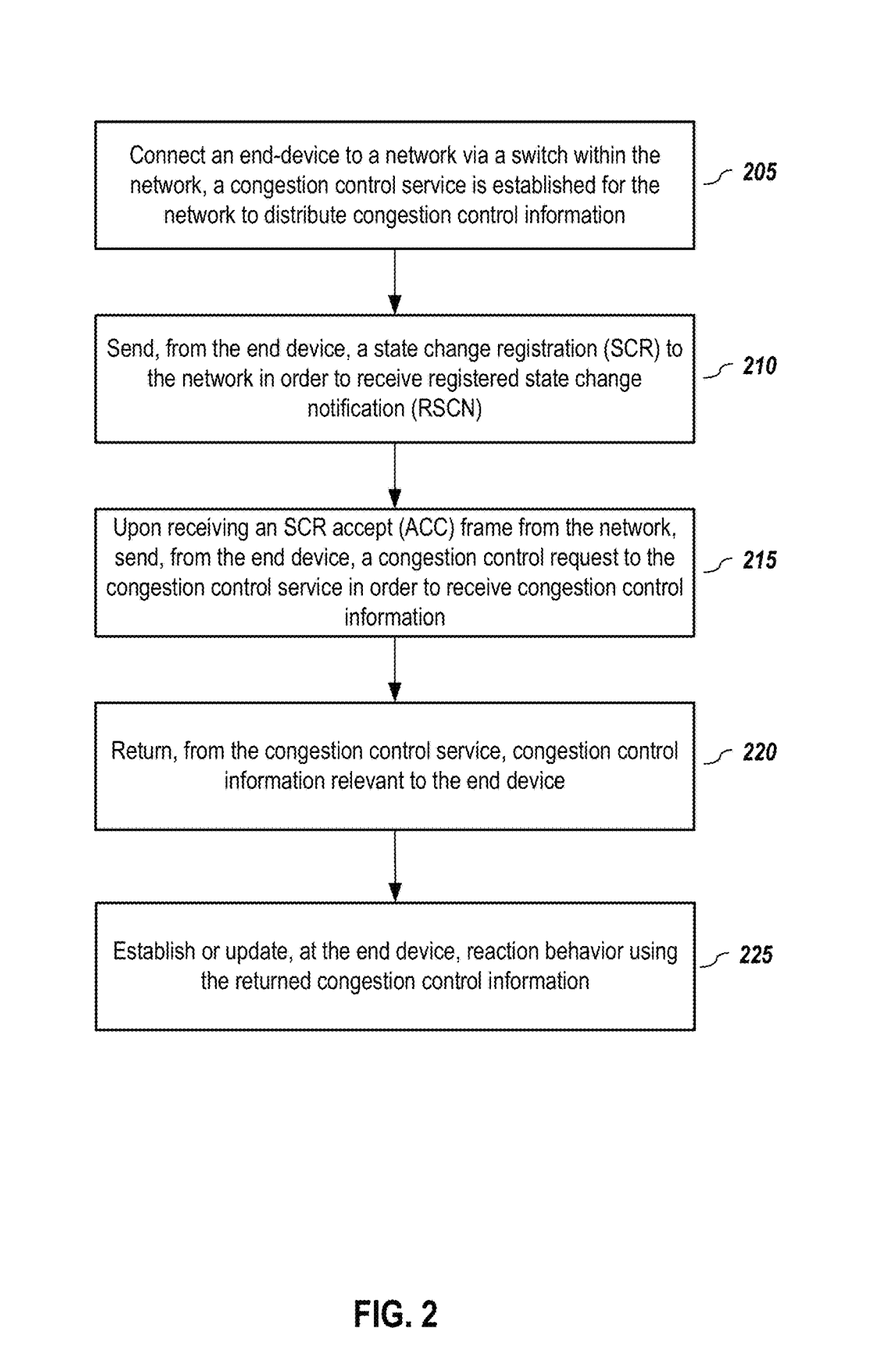
FIG. 2 depicts a process for providing congestion control service using a distributed congestion configuration database, according to embodiments of the present disclosure.

FIG. 2 depicts a process for providing congestion control service using a distributed congestion configuration database, according to embodiments of the present disclosure. In step 205, an end device, e.g., a host, connects to a network, e.g., a Fibre Channel Fabric, via a switch. A congestion control service is established for the network to distribute congestion control information. One or more login processes may be needed to successfully establish a connection between the end device and the Fibre Channel Fabric. In step 210, upon the connection being established, the end device sends a state change registration (SCR) to the network in order to receive RSCN. In step 215, upon receiving an SCR accept (ACC) frame from the network, the end device sends a congestion control request to the network in order to receive congestion control information. In step 220, the congestion control service returns congestion control information relevant to the end device. In step 225, the end device establishes or updates its reaction behavior using the returned congestion control information.

C. Embodiments of Flow Sequence

Figure 3:
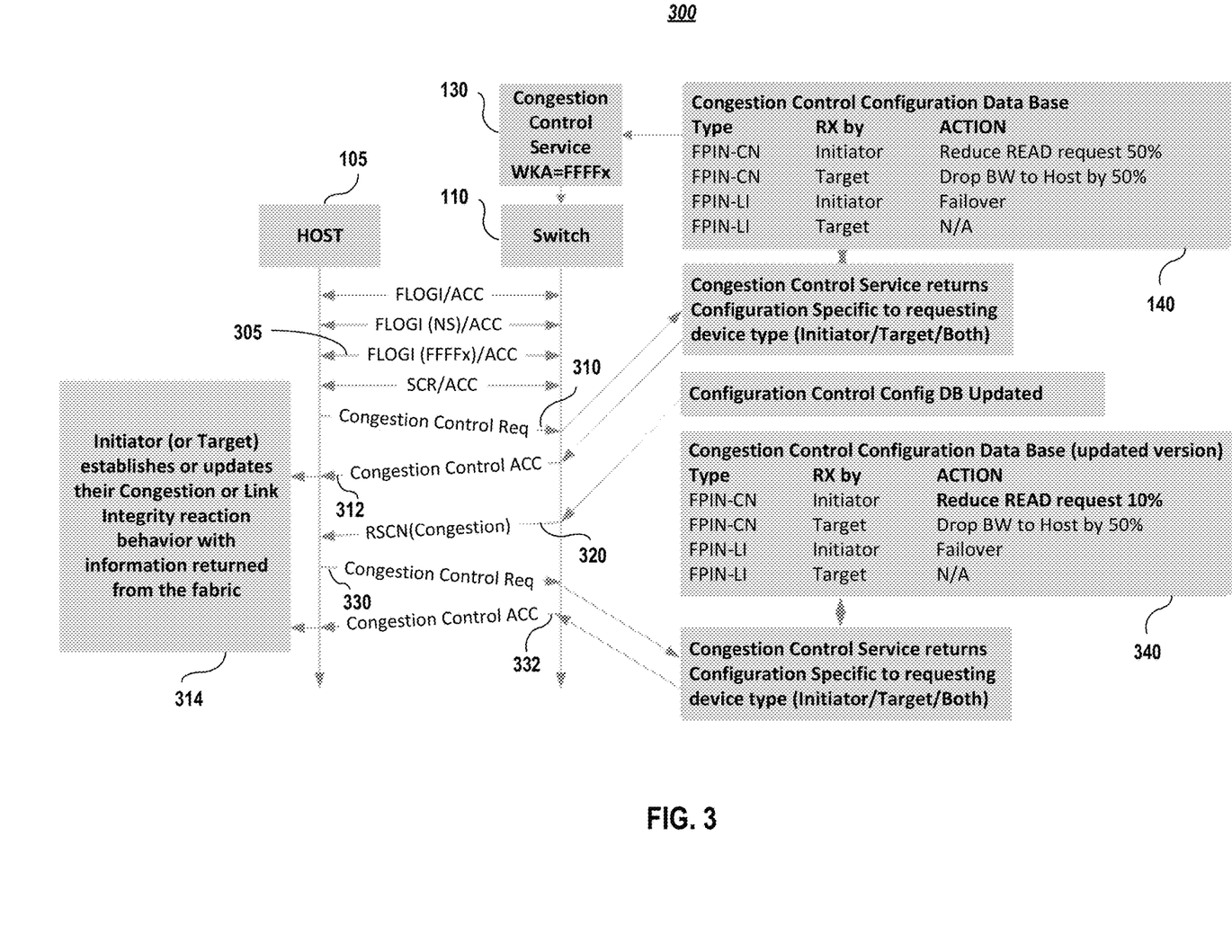
FIG. 3 depicts a sequence diagram of events between various entities, according to embodiments of the present disclosure.
Figure 4A:
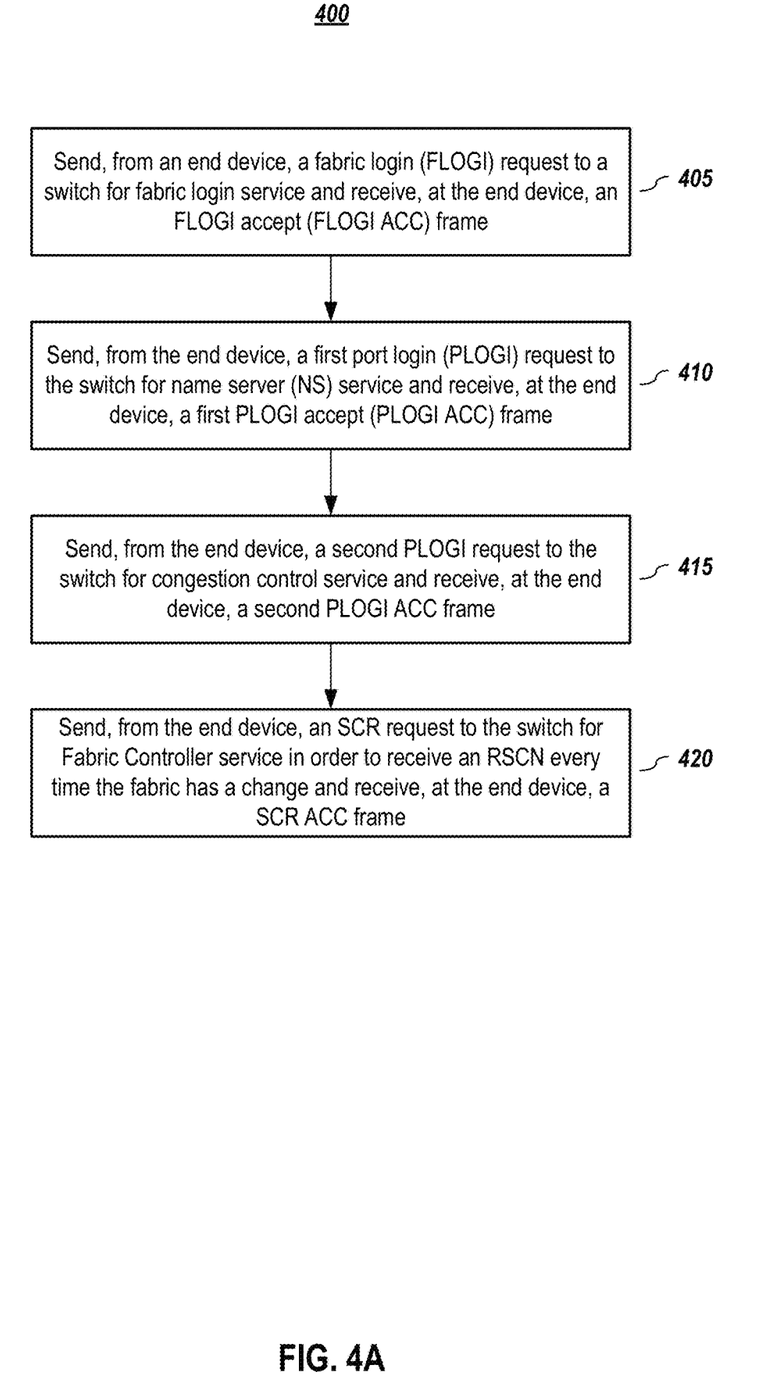
FIG. 4A depicts a login process corresponding to the sequence diagram, according to embodiments of the present disclosure.
Figure 4B:
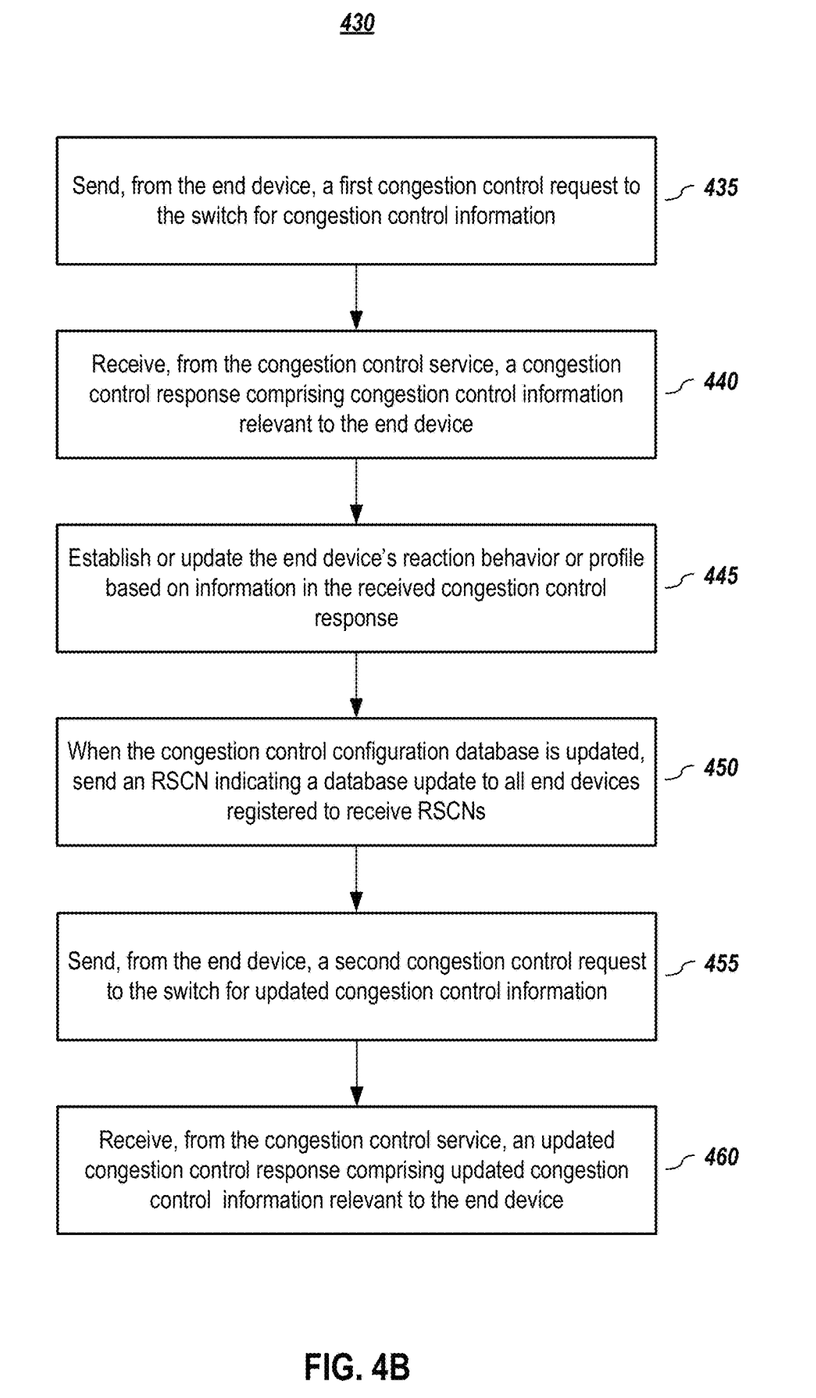
FIG. 4B depicts a congestion control configuration establishing and updating process corresponding to the sequence diagram, according to embodiments of the present disclosure.
Figure 4C:
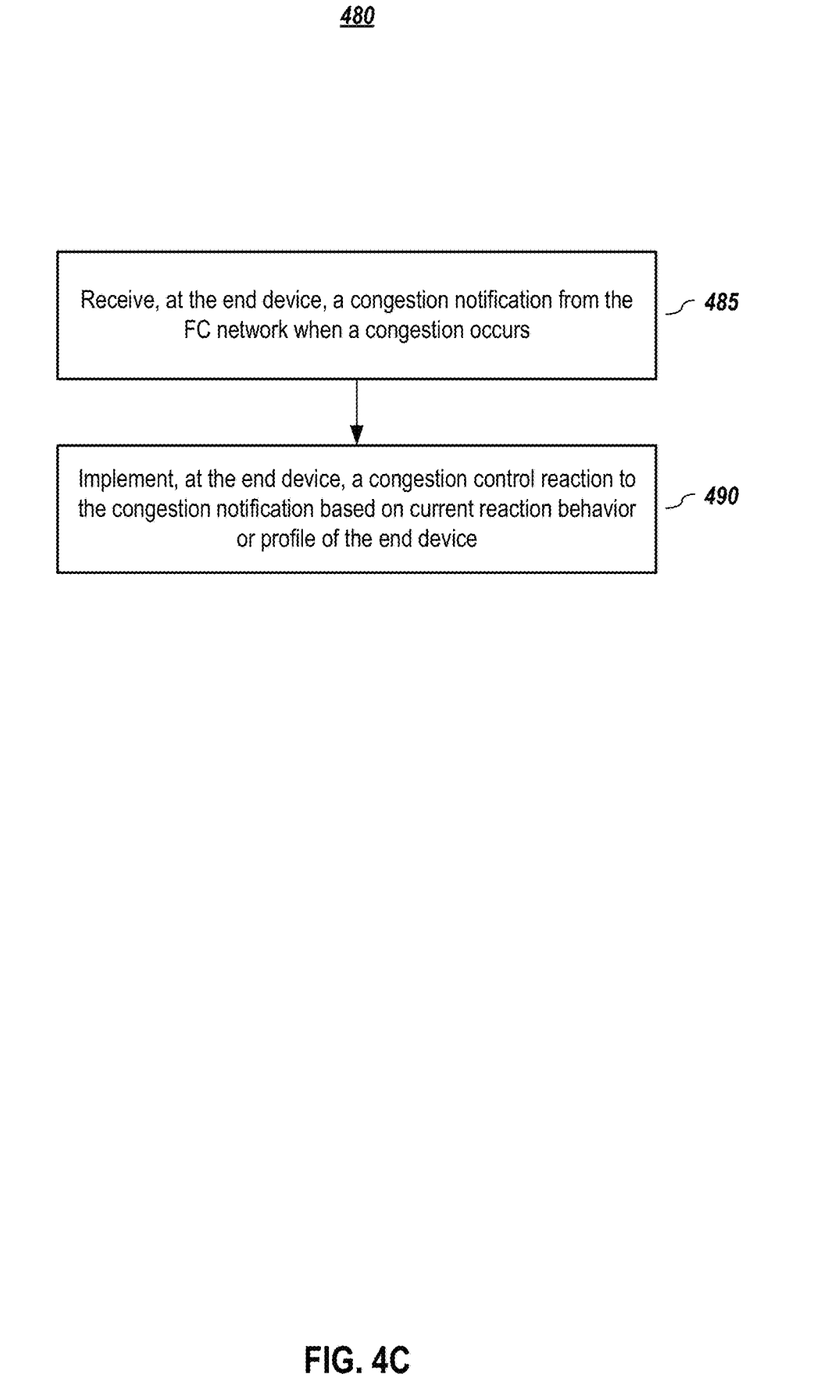
FIG. 4C depicts a congestion control implementation process corresponding to the sequence diagram, according to embodiments of the present disclosure.

FIG. 3 depicts a sequence diagram of events between various entities, according to embodiments of the present disclosure. The diagram illustrates that congestion control information may be distributed among devices in a standards-based fabric without relying on specific implementation using Application Programming Interfaces by a specific vendor, if they exist. FIGS. 4A-4C depict various processes corresponding to the sequence diagram in FIG. 3, according to embodiments of the present disclosure.

In the beginning of the sequences is a login process, as shown in FIG. 4A. When an end device, e.g., a host 105, initializes a connection to a switch 110 in the network (e.g., a FC fabric), the end device does not know its address within the fabric. The fabric may have multiple well-known addresses reserved for FC services, e.g., fabric login, name server, fabric controller, management server, etc. In one or more embodiments, a congestion control service 130 is established for the fabric and associated to a well-known address (e.g., FFFFFx), which is different from the aforementioned multiple well-known addresses. In one or more embodiments, a congestion control server is provided for the fabric and resides under the management server.

In step 405, the end device sends a fabric login (FLOGI) request to the switch for fabric login service at a first well-known address (e.g., FFFFFE) on the switch, and the switch sends an FLOGI accept (FLOGI ACC) frame with a fabric address assigned to the end device for confirmation. The fabric login is performed between a node port (N-port) and a fabric port (F-port).

In step 410, the end device sends a first port login (PLOGI) request to a second well-known address (e.g., FFFFFC) on the switch for name server (NS) service, and the switch sends a first PLOGI accept (PLOGI ACC) frame to the end device for confirmation. The port login is performed between an N_Port and a fabric service or another N_Port in order to establish a session. The port login may be necessary such that any upper level communication may happen. During the port login process, the switch may write the information of the end device to the name server.

In step 415 (corresponding to the event 305 in FIG. 3), the end device sends a second PLOGI request to a third well-known address (e.g., FFFFFx, different from the first and second well-known addresses) on the switch for congestion control service, and the switch sends a second PLOGI ACC frame to the end device for confirmation.

In step 420, the end device sends a state change registration (SCR) request to a fourth well-known address (e.g., FFFFFD) on the switch for Fabric Controller service in order to receive an RSCN every time the fabric has a change, and the switch sends a SCR ACC frame to the end device for confirmation.

FIG. 4B depicts a control configuration establishing and updating process corresponding to the sequence diagram, according to embodiments of the present disclosure. Upon finishing the SCR registration, the end device may send a first congestion control request to the switch for congestion control information in step 435 (corresponding to the event 310 in FIG. 3). In one or more embodiments, the first congestion control request is also sent to the third well-known address (e.g., FFFFFx) on the switch 110 associated with the congestion control service 130, similar to the second PLOGI request.

As described in accordance with FIG. 1, the congestion control service 130 may contain a congestion control configuration database 140 for information distribution in the FC fabric 110. The congestion control configuration database 140 may a table comprising a plurality of rows of data entries in columns of event type (TYPE), end-device (RX by), and action.

In step 440 (corresponding to the event 312 in FIG. 3), the end device receives, from the congestion control service, a congestion control response comprising congestion control information relevant to the end device. The information may comprise one or more possible notification types (e.g., FPIN-CN or FPIN-LI) for that initiator and as well as the action associated with each notification. For example, if the end device is an initiator, the information may an initiator action (e.g., reduce READ request by 50%) for an FPIN-CN notification, or another initiator action (e.g., failover to port-x (multipathing) for an FPIN-CN notification. In another example, if the end device is a target, the information may be a target action, e.g., drop bandwidth used to sending data to a host by 50%, for an FPIN-CN notification.

In step 445, the end device establishes or updates its reaction behavior or profile based on information in the received congestion control response, as illustrated in block 314 in FIG. 3.

In one or more embodiments, the congestion control configuration database may be updated. The update may be implemented by a fabric administrator periodically or dynamically (e.g., in response to a Fabric event). Updates may be distributed automatically. Update of the congestion control configuration database may be implemented to improve overall fabric performance using machine learning algorithms. For example, for an FPIN-CN notification, an associated initiator action may be updated from "reduce READ request by 50%" into "reduce READ request by 10%", if the fabric determines that a 10% reduction is adequate to handle a network congestion.

In step 450 (corresponding to the event 320 in FIG. 3), when the congestion control configuration database is updated, an RSCN indicating a database update may be sent to all end devices registered to receive RSCNs. In step 455 (corresponding to the event 330 in FIG. 3), upon receiving the RSCN, the end device sends a second congestion control request to the switch for updated congestion control information in the updated congestion control configuration database 340. In step 460 (corresponding to the event 332 in FIG. 3), the end device receives, from the congestion control service, an updated congestion control response comprising updated information relevant to the end device for reaction behavior or profile updating.

FIG. 4C depicts a congestion control implementation process corresponding to the sequence diagram, according to embodiments of the present disclosure. In step 485, the end device receives a congestion notification from the FC fabric when a congestion occurs. In step 490, the end device implement a congestion control reaction in response to the congestion notification based on the end device's current reaction behavior or profile.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
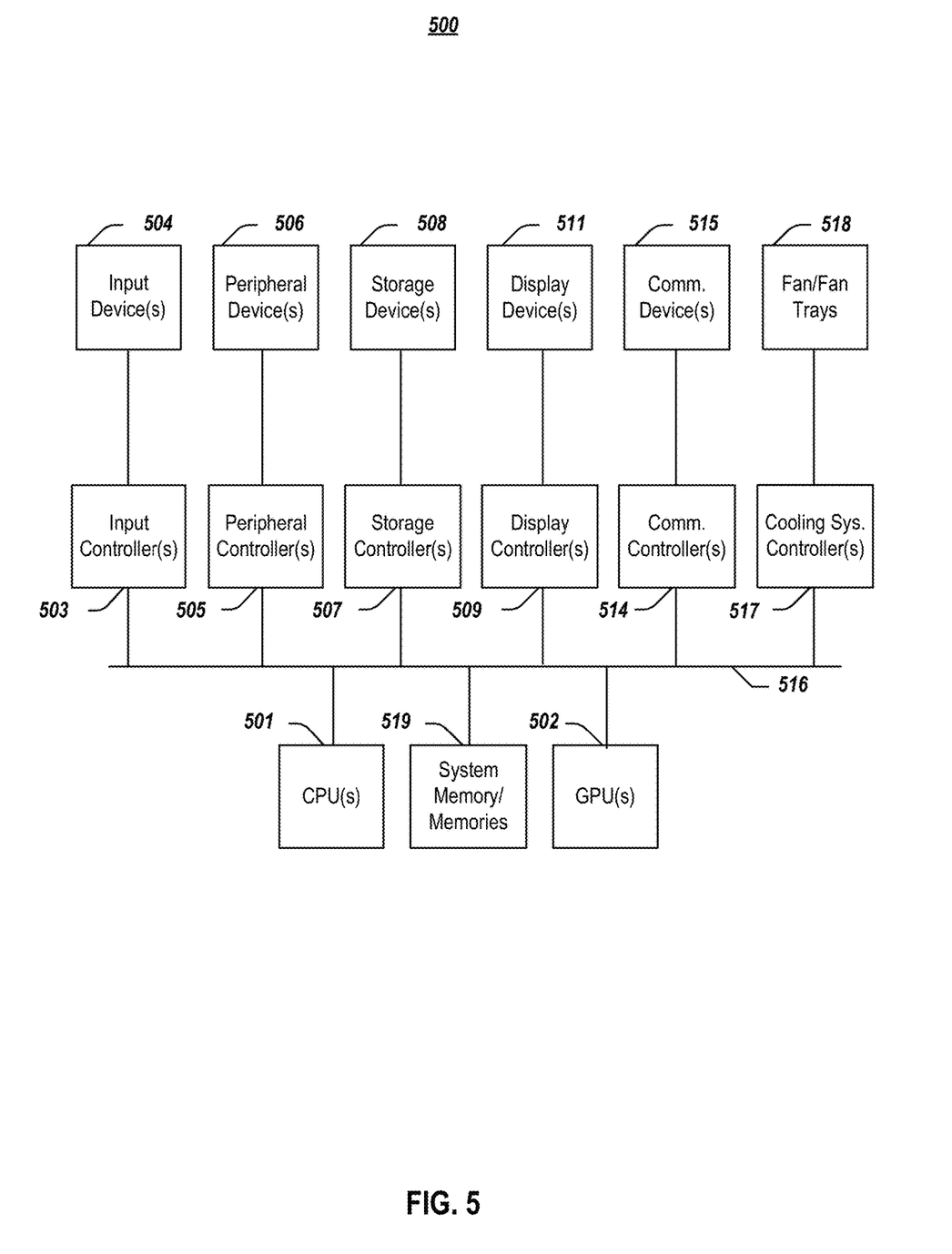
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
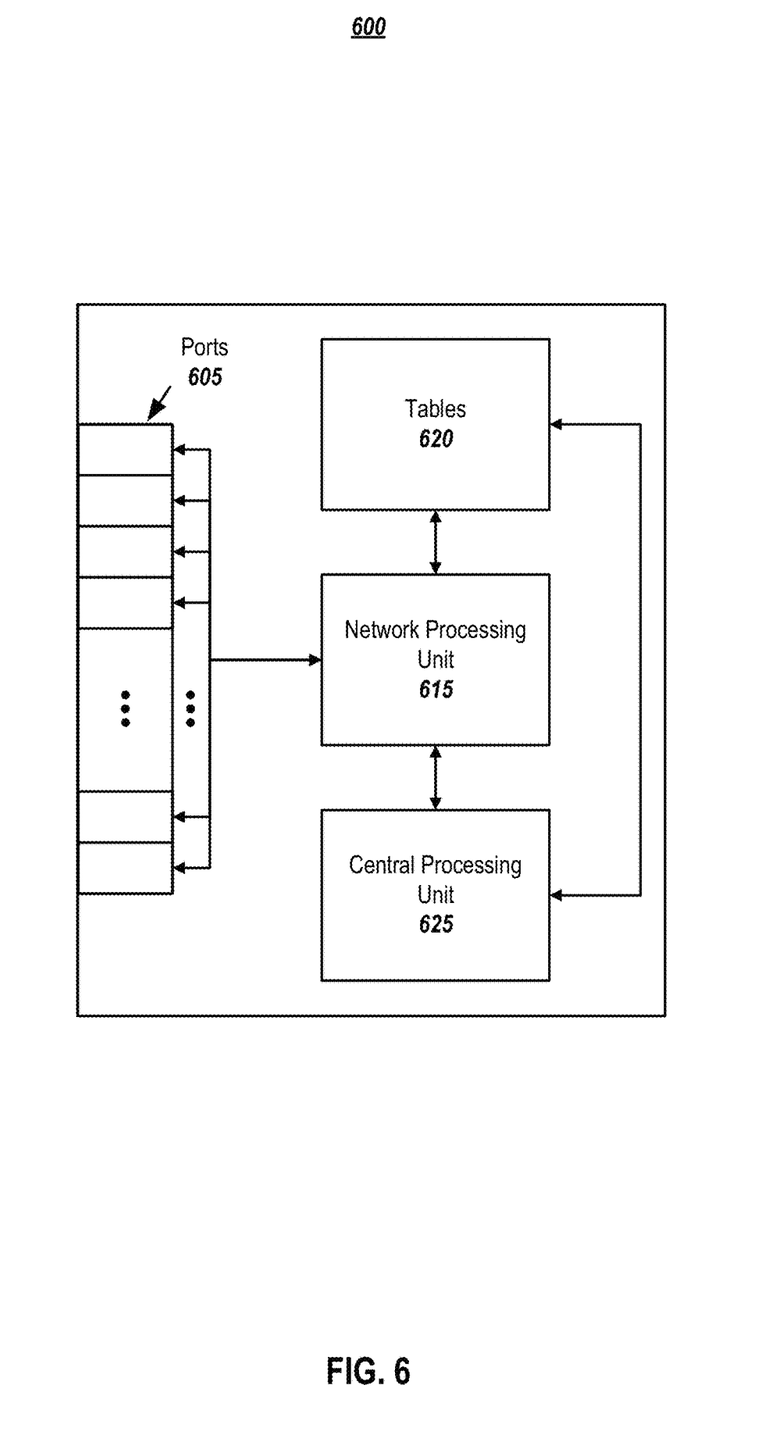
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for congestion control service comprising:
    given an end device connected to a network via an information handling system in the network, in which one or more information handling systems in the network comprises a congestion control service to distribute congestion control information, performing steps comprising:
        sending, from the end device, a state change registration (SCR) to receive one or more registered state change notifications (RSCNs);
        upon receiving an SCR acceptance, sending, from the end device, a first congestion control request to the congestion control service to receive congestion control information that is relevant to the end device;
        receiving, from the congestion control service at the end device, congestion control information that comprises an indicator of an action for the end device that, when implemented, causes a behavior of the end device; and
        implementing the action at the end device to affect behavior of the end device based upon the congestion control information that was received from the congestion control service.

2. The computer-implemented method of claim 1 wherein the network is a Fibre Channel (FC) fabric.

3. The computer-implemented method of claim 2 wherein the congestion control service is associated with a known address on the information handling system to distribute congestion control information.

4. The computer-implemented method of claim 2 wherein the congestion control service is provided by a congestion control server residing under a management server of the FC fabric.

5. The computer-implemented method of claim 2 wherein the congestion control service contains a congestion control configuration database storing congestion control information.

6. The computer-implemented method of claim 5 wherein the congestion control configuration database comprises, for each entry of a set of entries, an event type for congestion, one or more identifiers of one or more end devices associated with the event, and an action.

7. The computer-implemented method of claim 6 wherein the event type is a Fabric Performance Impact Notification for Congestion Notification (FPIN-CN) or FPIN for link integrity (FPIN-LI).

8. The computer-implemented method of claim 6 wherein an identifier is a wildcard entry, an end device class for selected end devices or a combination of selected end devices, or a specific device identifier.

9. The computer-implemented method of claim 5 further comprising:
    when the congestion control configuration database is updated, sending, from the congestion control service, an RSCN indicating a database update to end devices affected by the database update;
    receiving, from the end device, a second congestion control request for updated congestion control information; and
    sending, from the congestion control service, an updated congestion control response comprising updated congestion control information relevant to the end device.

10. A non-transitory computer-readable medium or media comprising one or more sequences of instructions which, when executed by at least one processor, causes steps to be performed comprising:
    receiving a first congestion control request for congestion control information from an end device at a congestion control service on an information handling system in a network, the congestion control service comprising a congestion control configuration database for congestion control information distribution;
    returning, from the congestion control service, a congestion control response comprising congestion control information that comprises an indicator of an action relevant to the end device for the end device to implement a congestion reaction behavior or profile; and responsive to the congestion control configuration database having an update, sending, from the congestion control service, a notification indicating the update to the end device for updating the congestion reaction behavior or profile.

11. The non-transitory computer-readable medium or media of claim 10 wherein the first congestion control request, the congestion control response, and the notification utilize Fibre Channel (FC)-based communications mechanisms.

12. The non-transitory computer-readable medium or media of claim 10 wherein the congestion control configuration database comprises, for each entry of a set of entries, an event type for congestion, one or more identifiers of one or more end devices associated with the event, and an action.

13. The non-transitory computer-readable medium or media of claim 12 wherein the event type is a Fabric Performance Impact Notification for Congestion Notification (FPIN-CN) or FPIN for link integrity (FPIN-LI).

14. The non-transitory computer-readable medium or media of claim 12 wherein an identifier is a wildcard entry, an end device class for selected end devices or a combination of selected end devices, or a specific device identifier.

15. A system for congestion control service comprising:
one or more processors;
one or more network interfaces, communicatively coupled to at least one of the one or more processors, for communicating with one or more end devices; and
a non-transitory computer-readable medium or media comprising one or more sets of instructions which, when executed by at least one of the one or more processors, causes steps to be performed comprising:
supporting a congestion control service to distribute congestion control information at least one of the one or more end devices;
receiving, from an end device, a first congestion control request for congestion control information; and
returning, to the end device, a congestion control response comprising congestion control information relevant to the end device, in which the congestion control information comprises an event type identifier and a corresponding action;
wherein the first congestion control request and the congestion control response utilize a standards-based communications mechanism.

16. The system of claim 15 wherein the standards-based communications mechanism utilizes one or more Fibre Channel (FC) services.

17. The system of claim 15 wherein the congestion control service comprises a congestion control configuration database storing congestion control information.

18. The system of claim 17 wherein the congestion control configuration database comprises, for each entry of a set of entries, an event type for congestion, one or more identifiers of one or more end devices associated with the event, and an action.

19. The system of claim 17 wherein the end device
has submitted a state change registration (SCR) request to receive a registered state change notification (RSCN) after a change has been made to at least the congestion control configuration database and wherein the non-transitory computer-readable medium or media further comprises one or more sets of instructions which, when executed by at least one of the one or more processors, causes steps to be performed comprising:
responsive to the congestion control configuration database having an update relevant to the end device, causing the update relevant to the end device to be sent to the end device.

20. The system of claim 6 wherein the event type is a Fabric Performance Impact Notification for Congestion Notification (FPIN-CN) or FPIN for link integrity (FPIN-LI).

* * * * *